INVENTOR:
HUIBRECHT KRUIK
BY:
HIS ATTORNEY

United States Patent Office 3,378,024
Patented Apr. 16, 1968

3,378,024
BLENDING CONTROL SYSTEM
Huibrecht Kruik, Estado Falcon, Venezuela, assignor to Shell Oil Company, New York, N.Y., a corporation of Delaware
Filed July 20, 1964, Ser. No. 383,741
Claims priority, application Netherlands, July 23, 1963, 295,644
2 Claims. (Cl. 137—98)

ABSTRACT OF THE DISCLOSURE

A control apparatus for blending two liquids to accurately determine the composition of the end product. Liquid level indicators in two tanks control respective values of two variable resistors in a bridge network. The bridge network generates an error signal proportinoal to the difference between the ratio of the variable resistors and a predetermined number. The error signal is adapted to control the flow of one liquid.

---

Figure 1:
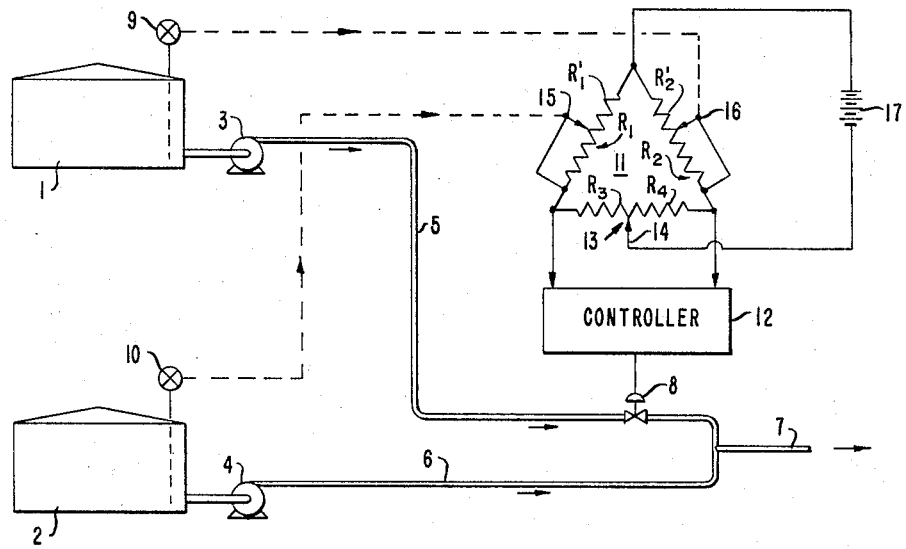

The invention relates to a method and an apparatus for mixing or blending two liquids in a prescribed mixing ratio. More particularly, this invention relates to a method and apparatus for mixing two liquids in a prescribed ratio using a control device, such as a bridge circuit, on which the said mixing ratio can be set and from which a control signal is derived; the control signal is then used to adjust the flow of at least one of the streams of liquid to be mixed. The invention is of particular importance for directly mixing liquids in a pipe line.

A method of this type is already known from the German patent specification No. 750,937. According to this patent, a Wheatstone bridge is used as the control device on which the desired mixing ratio is set by means of a potentiometer. The flow rate of each of the two liquid streams to be mixed is measured and two variable resistors in the bridge circuit are controlled in such a way that the value of each resistor is representative of the momentary value of the flow rate of the relevant liquid. The bridge output voltage or the bridge output current is used to control a control valve in one of the streams of liquid.

In the equilibrium state, i.e., when the momentary ratio of the measured flow rates of the streams of liquid corresponds to the desired mixing ratio set on the bridge circuit, both variable resistors are in a position of rest, and the bridge output voltage is zero. If deviations from the state of equilibrium occur in the streams of liquid measured, the value of the bridge voltage deviates from zero and the control valve is then adjusted so that the momentary ratio of the streams of liquid measured again becomes equal to the desired mixing ratio. Hence, the object of the known method is to continuously make the momentary ratio of the measured flow rates of the streams of liquid as nearly as possible equal to the value of the mixing ratio set on the bridge.

Operating in this way, however, it is never known whether the supplied mixture actually satisfies the prescribed mixing ratio set on the bidge, since, during the mixing and despite the control, there are frequent deviations from the prescribed mixing ratio, which deviations often exist for a fairly long period of time. These deviations are caused, for example, by the time lag between the detection of a change in the flow rate of one of the liquids and the adjustment of the controlled flow rate to the proper value so that the prescribed ratio of mixing is attained. Such deviations may result in considerable error between the ratio of the constituents of the mixture finally obtained and the prescribed mixing ratio. Hence, if it is desired to carry out the mixing to some degrees of accuracy, the mixture is directed into a mixing tank where the composition of the mixture is checked and if necessary corrected by extra addition of one of the liquids before it is supplied to its final destination. It is obvious that when mixing in this manner, no accurate mixing is possible in the line itself, i.e. without the use of a mixing tank.

The present invention relates to a method and apparatus for the mixing of two liquids whereby the resultant mixture immediately has its correct composition so that later correction is not necessary. The mixing can therefore be carried out in the line itself, without the need for a mixing tank. Moreover, the apparatus required according to the invention is relatively inexpensive since the use of expensive volumetric flow meters, such as are necessary for an accurate flow measurement, is avoided.

In the method of mixing according to the invention, the ratio of the quantities in which both liquids are supplied, and not the momentary ratio of the flow rates of the streams of liquid, is the controlling factor. By utilizing the ratio of the supplied liquids as the controlling variable, not only are temporary deviations from the desired ratio of the streams of liquid neutralized, but compensation is also provided for the influence of these temporary deviations on the final result of the mixing (and virtually immediately compensated), so that the composition of the mixture supplied is continuously, at least substantially, correct. Hence, during the mixing it is even possible to intentionally cause temporary deviations from the desired ratio of the streams of liquids and still produce the desired final mixture.

According to the invetnion, as each of the liquids is withdrawn from its respective storage tank and depending on the liquid level or the drop thereof in each of the storage tanks, a corresponding variable resistance in a control device, e.g., the bridge circuit already mentioned above, is regularly adjusted, viz in such a way that the change in magnitude of the variable resistance represents the amount of liquid which has been withdrawn from the relevant storage tank as determined from a given point of time onwards. The beginning of the mixing is normally taken as the initial point of time. The variable resistance may be adjusted regularly, i.e., either from time to time (for example, one or more times a minute or in certain circumstances a few times each hour) or continuously. Preferably, however, the adjustment takes place continuously.

In the control device, the set or desired mixture ratio is compared with the ratio of the signals emanating from the storage tanks, which signals are related to the amounts of liquid withdrawn from the tanks since a given point of time, to produce a control signal proportional to any difference between the two ratios. This control signal is then utilized to vary one (or both) of the streams of liquid in a conventional manner in order to adjust the measured ratio to the desired value.

Although in principle a simple Wheatstone bridge may be used as the control device for the present method of mixing, the regular adjustment of the two variable resistances causes the amplification factor of the control circuit to change as the mixing proceeds. In order to keep this amplification factor constant or at least substantially constant, a bridge circuit, in which the electric current in the branches comprising the variable resistances is kept more or less constant, could be used.

A preferred embodiment of a control device particularly suitable for the present method is obtained by means of a pair of double potentiometer circuits, one double potentiometer circuit for each of the streams of liquid. Each double potentiometer circuit is formed by a first potentiometer whose adjustable contact is positioned according to the prescribed mixing ratio and a second potentiometer connected thereto with the resistance of the second potentiometer between one end thereof and its adjustable contact representing the variable resistance. The two adjustable contacts of the potentiometers serving as the variable resistances mentioned are connected in phase opposition to the input of a summing amplifier. The input of the amplifier is also connected to a source of variable voltage for the zero setting of the control device. The output of the amplifier is in turn connected to a control valve in one of the liquid supply lines via a controller.

The preferred embodiment has the additional advantage that, at the beginning of the mixing, it is not particularly necessary for the variable resistances to be set at particular values in order to balance the circuit as is necessary when using a Wheatstone bridge. The necessary setting of the variable resistances in the Wheatstone bridge prior to mixing in order to permit the zero setting of the bridge requires that the connections between the meters of the storage tanks and the variable resistances be interrupted for a period of time, causing inconvenience and a loss of time and money. With the preferred embodiment of the control device, however, the zero setting is obtained by means of the variable voltage source, so that the connections between the tank meters and the variable resistances need not be interrupted.

Figure 2:
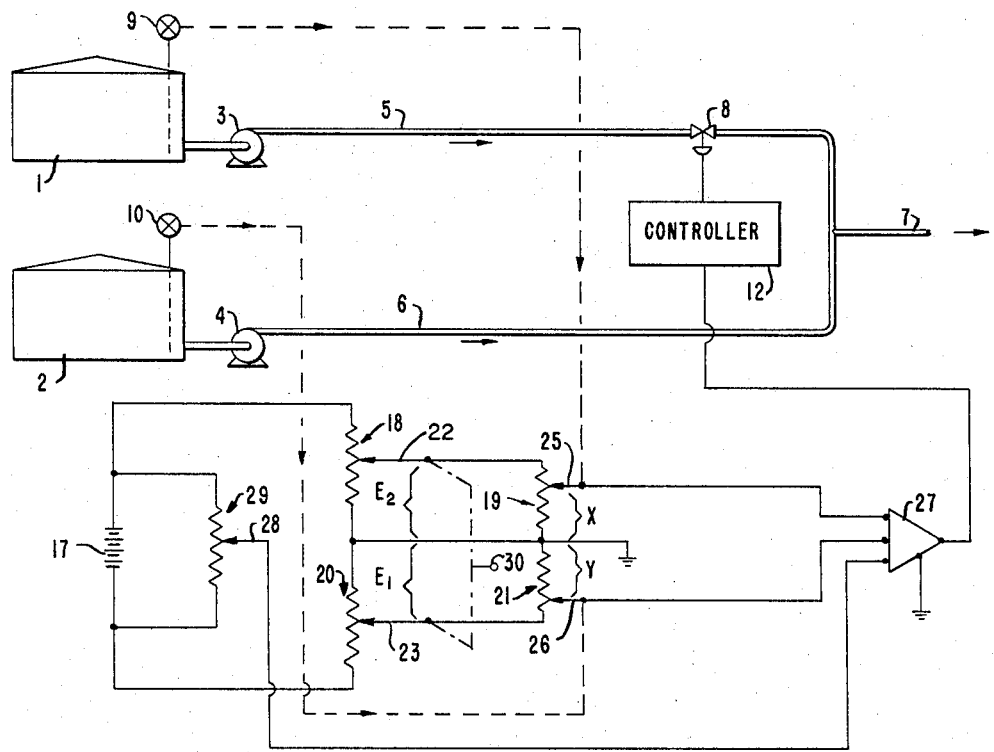

The invention will now be illustrated with reference to the drawing, wherein:

FIGURE 1 is a diagrammatic representation of a control scheme according to the invention using an ordinary Wheatstone bridge; and FIGURE 2 is a diagrammatic representation of the preferred embodiment of the control apparatus according to the invention.

Referring now to the figures wherein like reference numerals refer to the same apparatus, the liquids to be mixed, which are initially stored in storage tanks 1 and 2, are pumped with the aid of two pumps 3 and 4, respectively, through two pipe lines 5 and 6, respectively, to a common pipe line 7 where the two liquids are mixed together. Pipe line 5 is also equipped with a control valve 8, by means of which the flow rate of the stream of liquid in this line can be controlled. The storage tanks 1 and 2 are provided with meters 9 and 10, respectively, which measure the liquid-level in the storage tank. Such meters are old and well known in the art. For example, a meter of this type can emit a signal which is a measure for the height, either absolute or relative to a standard level, of the liquid in the tank. The change in the signal magnitude with respect to the signal magnitude at the beginning of the mixing is then a measure of the quantity of liquid withdrawn from the storage tank since the mixing began. It is also possible to use a meter having an output signal which is a direct measure of the change in level, in this case the drop in level, since the beginning of the mixing. Preferably the meter used produces a continuous output signal. However, it is to be understood that meters which only produce signals from time to time, i.e., in a discontinuous manner, may also be used.

In the embodiment shown in FIGURE 1, the apparatus for controlling the mixing ratio comprises a Wheatstone bridge 11 and a controller 12, the output signal of which controls the position of the control valve 8. The controller 12 is usually provided with proportional and integral action. The bridge is formed by four resistances $R_1$, $R_2$, $R_3$ and $R_4$. The resistances $R_3$ and $R_4$ are parts of a potentiometer 13 having an adjustable contact 14. The position of the contact 14 determines the proportion of potentiometer 13 which is included in each of the resistances $R_3$ and $R_4$ and is positioned so that the ratio of $R_3$ to $R_4$ is the desired value of the mixing ratio of the liquids. The resistances of $R_1$ and $R_2$ can at least partly be short-circuited with the aid of adjustable contacts 15 and 16, respectively, and the parts of the resistances $R_1$, $R_2$ not short-circuited are designed by $R_1'$ and $R_2'$, respectively.

The meters 9 and 10 are connected mechanically or in any other suitable manner, e.g. servomotor, electrically driven shaft, etc., with the contacts 16 and 15, respectively. The power or input for the bridge circuit is provided by a direct-current source 17 while the bridge output voltage, which is zero when the bridge is balanced, is connected to the input of controller 12. The connections of source 17 and controller 12 may, if desired, be inter-exchanged.

The operation of the circuit can most easily be explained with reference to a simple example.

For purposes of the example it is assumed that the storage tanks 1 and 2 have the same tank factors, i.e., amount of liquid withdrawn per cm. drop in level, the desired mixing ratio is 1:1 ($R_3=R_4$) and the contacts 15 and 16 are both in their initial position ($R_1'=R_1=R_2'=R_2$) when the mixing commences. As the mixing proceeds, meters 9 and 10 each develop a signal commensurate with the drop in level in the corresponding tanks 1 and 2. These signals cause the contacts 15 and 16 to be moved in such a way that the changes of resistances $R_1'$ and $R_2'$, respectively, from the initial position correspond to the quantity of liquid which has been withdrawn from tanks 1 and 2, respectively, since the beginning of the mixing.

In the present assumed example of a 1 to 1 mixing ratio and supply tanks having equal tank factors, both contacts 15 and 16 should be identically shifted along the resistances $R_1$ and $R_2$ until the mixing has been completed in the absence of any deviations from the desired mixing ratio. The bridge output voltage would then be constantly zero. Any deviations from this ideal mixing operation, which may, for example, be the result of an unequal operation of the pumps 3 and 4, are reflected in the bridge output voltage which then deviates from zero causing controller 12 to adjust valve 8 until a mutually identical position of the contacts 15 and 16 has again been achieved, indicating that just as much liquid has in fact been supplied into the mixture flowing through pipe line 7 from storage tank 1 as from storage tank 2. The final result does not therefore depend on deviations in the flow rate streams of liquid occurring during the mixing process as it does in the previously known mixing method described above.

It is to be understood that instead of reducing the resistances $R_1'$ and $R_2'$, these resistances may be increased in magnitude if desired and that if the mixing ratio differs from the value 1:1, the resistances $R_1'$ and $R_2'$ should also change during the mixing in a mutually different manner, i.e., in proportion to the desired mixing ratio. Furthermore, the initial positions of the contacts 15 and 16 will often differ from those assumed in the above simple instance of a 1 to 1 mixing ratio. These contact positions are usually set in such a way that at the beginning of the mixing the bridge output voltage is zero.

In the event that the tank factors of the storage tanks are different, the difference can be taken into account either in the magnitude of the signals emitted by the tank meters, in the transmission of these signals to the bridge circuit, or when positioning the contact 14.

It is also possible to shift the position of the contacts 15 and 16 at intervals, for example, every second or every minute, so that from time to time the positoin of the contacts is made to correspond to the liquid levels or level drop in the storage tank. Although such a system for positioning the contacts 15 and 16 performs satisfactorily, preferably the contacts are continuously adjusted.

Generally, no liquid should be pumped into the storage tanks during the mixing unless, in a manner not shown further in the figures, an extra signal is passed to the bridge circuit, i.e., contacts 15 and 16, which takes into account the additional quantity of liquid supplied to the relevant storage tank.

As has already been observed, the bridge circuit used in the embodiment of the invention according to FIGURE 1 has the disadvantage that the amplification factor of the control circuit (9, 10, 11, 12, 8) changes as the mixing proceeds. The current through the bridge depends, inter alia, on the magnitude of the resistances $R_1'$ and $R_2'$. Consequently, when there are deviations from the ideal mixing ratio, the magnitude of the bridge output voltage, which is the input voltage of the controller 12, also depends on the position of the contacts 15, 16. In the simple case discussed above, a deviation from the ideal position of the contacts 15, 16 at the beginning of the mixing period leads to a much smaller bridge output voltage than would be the case with a similar deviation at the end of the mixing period.

In the embodiment shown in FIGURE 2 a control device is shown which does not have this disadvantage and in which moreover the balancing of the bridge does not need to be carried out at the beginning of the mixing period by means of adjusting the contacts of the liquid level indicating variable resistances (which in effect means interruption of the connections between the liquid level meters and the variable resistances).

According to this embodiment of the invention, the control device contains a double potentiometer circuit for each of the liquids, viz, potentiometers 18 and 19 for the liquid metered by liquid level meter 9 and potentiometers 20 and 21 for the liquid metered by liquid level meter 10. The potentiometers 18 and 20 are arranged in series with each other and connected across the voltage source 17, while potentiometers 19 and 21 are connected in series with each other and between the movable contacts 22 and 23 of potentiometers 18 and 20, respectively. The common junction of potentiometers 18 and 20 and that of potentiometers 19 and 21 are connected together and to a point of reference potential, preferably ground. Contact 25 of the potentiometer 19 and the movable contact 26 of the potentiometer 21 are connected to the input of a summing amplifier 27, the output signal of which serves as the input signal for the controller 12. It should be noted, that in the above-described circuit, the two input signals to the amplifier 27, i.e., the voltage between contact 25 and ground and that between 26 and ground, are in phase opposition, i.e., in the particular described circuit, the voltage at contact 25 is positive while that at contact 26 is negative. Also connected to the input of the amplifier 27 is a third input signal which is used to initially achieve a zero setting for the control system. This third input signal is derived from the movable contact 28 of a potentiometer 29 which is connected across the voltage supply 17.

In order to utilize the above-described control circuit for the purpose of mixing the contents in tanks 1 and 2, the movable contacts 25 and 26 are connected to the liquid level meters 9 and 10, respectively, and are positioned in response to the output signals therefrom. These respective connections are so adjusted that the magnitude of the resistance between contact 25 and ground and between contact 26 and ground at all times represents the liquid levels in the tanks 1 and 2, respectively. The drops or changes in the levels of the liquid in tanks 1 and 2 during the mixing are therefore shown by corresponding changes of the variable resistances between movable contacts 25 and ground and movable contact 26 and ground, respectively. The described or desired mixing ratio is set into the control system by positioning the movable contacts 22 and 23 of the potentiometers 18 and 20, respectively, until the ratio of the voltages between the respective movable contacts 22 and 23 and ground is the desired ratio. Preferably, the movable contacts 22 and 23 are adjusted simultaneously as for example, by means of an adjusting knob 30 mechanically coupled to both movable contacts. Alternatively, however, the continuous potentiometers 18 and 20 may be replaced by multitapped resistances so that fixed proportions of the resistances may be switched into the circuit.

In order to more easily explain the operation of the circuit, let the voltage between contact 22 and ground be $E_2$, that between contact 23 and ground be $E_1$ and that of contact 28 be $E_3$; the position of contact 25 relative to ground be $x$ and of contact 26 relative to ground be $y$, $x$ and $y$ varying between 0 and 1 and corresponding respectively to the liquid levels in tanks 1 and 2 at the beginning of the mixing.

Once the desired ratio $E_1/E_2$ has been set into the control system and before any mixing has begun, the voltage $E_3$ is adjusted so that the input voltage to the amplifier 27 is zero, i.e., so that $$E_2 x - E_1 y + E_3 = 0$$

After this setting the mixing can begin. During the mixing the control system attempts to maintain the output of amplifier 27 equal to zero. Since as indicated above, the changes in the liquid levels in tanks 1 and 2 result in corresponding respective changes in the values of $x$ and $y$, which are represented by $\Delta x$ and $\Delta y$, the control system now controls so that $$E_2(x-\Delta x) - E_1(y-\Delta y) + E_3 = 0$$

which may be simplified to yield the relationship $$\frac{\Delta_x}{\Delta_y} = \frac{E_1}{E_2}$$

In other words the mixing is carried out in such a way that the amounts of liquid withdrawn from the storage tanks bear the same proportion to one another as the set, prescribed mixing ratio $(E_1/E_2)$. The above applies when the tank factors $F_1$ and $F_2$ are equal or when these factors have already been taken into account in the transmission between meter 9 and contact 25, and between meter 10 and contact 26. The said tank factors may also, however, be taken into consideration in the setting of the ratio $E_1/E_2$.

The control circuit outlined above has the advantage, that the magnitude of the control voltage no longer depends on the position which the contacts 25 and 26 occupy during the mixing. With the aid of the voltage $E_3$ the zero-setting is ensured independent of the initial levels in the storage tanks. By making all voltages ($E_1$, $E_2$ and $E_3$) dependent on the same voltage supply source 17, the control is independent of the regulation of the power supply 17. It is to be understood, however, that if constant or regulated voltage sources are available, that it is not necessary to use only one power source, but a number of separate power supplies may be used.

In order to retain the linearity, or at least a sufficiently large degree of linearity, of the mixing ratio setting and of the control of the mixing over a large range, it is desirable to ensure that potentiometers 19 and 21 do not overload potentiometers 18 and 20, respectively. Likewise the amplifier 27 should not exert too great a load on potentiometers 19 and 21. The linearity of the system may be retained, for example, by choosing the resistances of potentiometers 18 and 20 in the order of magnitude of ohms, that of potentiometers 19 and 21 in the oder of magnitude of a kilo-ohm, and the input impedance of the amplifier in the order of magnitude of a megohm. Another method of obtaining the desired linearity is through the use of amplifiers, e.g. cathode-followers, between the movable contacts 22 and 23 and the potentiometers 19 and 21 in such a way that potentiometers 19 and 21 no longer constitute a load on their respective potentiometers 18 and 20.

The mixing method according to the invention is particularly important when large quantities have to be mixed together, such as, for example, is the case when crude oils of varying origin are mixed. A high degree of accuracy in mixing was achieved when two crude oils were mixed in practice, even when using a simple bridge circuit type of control circuit as shown in FIGURE 1. For example, with a set mixing ratio of 7:3, the degree of accuracy proved to be 0.7% with a total of almost 2600 m.³ of mixture being supplied. With a set mixing ratio of 1:1 and a supplied quantity of approximately 2150 m.³ of mixture, the deviation from the set mixing ratio was immeasurably small.

It is to be understood, that the method according to the invention may also be used when a greater number of liquids, for example, three liquids A, B and C, is to be mixed. In this case there are three storage tanks and thus, three tank meters, two control devices according to the invention, and two control valves; further there are two desired mixing ratios, for instance the ratio between the liquids B and A and the other for the liquids C and A. The ratio $B/A$ may be set in the first control device which is connected to the tank meters A and B and the ratio $C/A$ set in the second control device which is connected to the tank meters C and A. The control signals produced by these devices would then be used for controlling the control valves in the liquid streams B and C respectively.

Additionally, the two control devices may be replaced by three double potentiometer circuits, one for each liquid as in FIGURE 2. The circuits B and A, and C and A would then be alternately combined to form a control device, e.g., by switching them alternately to the input of the amplifier 27, for controlling the control valves in liquid streams B and C, respectively. In order to provide for a continuous control of the control valves, the control signal of the device for one liquid stream should be memorized during the time the control device is actually controlling the other liquid stream. Preferably, one memory for each of the liquids to be controlled should be used with each memory being alternately connected with the output of the amplifier 27 and the input of the controller 12.

Obviously, various other modifications of the invention are possible in light of the above teachings without departing from the spirit of the invention. It is therefore to be understood that within the scope of the appended claims, the invention may be practiced otherwise than as specifically illustrated.

I claim as my invention:

1. An apparatus for controlling, in a prescribed ratio, the mixing of two liquid streams that originate from respective storage tanks comprising:
    meter means disposed in each of said storage tanks for detecting the liquid level in each of said storage tanks;
    a pair of variable resistors, each of said meter means being connected to one of said variable resistors to vary the magnitude of said variable resistors in accordance with the changes in the liquid level in the corresponding storage tank whereby the change in magnitude of said resistors is proportional to the quantity of liquid withdrawn from the corresponding storage tank;
    electrical circuit means for producing an error signal proportional to the difference in the prescribed ratio and the ratio of said variable resistors, said electrical circuit means comprising: a bridge circuit with each of said variable resistances forming one leg of the bridge circuit, the remaining two legs of said bridge circuit being formed by a potentiometer, the movable contact of which is positioned so that the ratio of the portions of the potentiometer which are included in each of the two legs of the bridge is the prescribed ratio; and
    means responsive to the error signal from said bridge circuit for controlling the flow in at least one of said liquid streams.

2. An apparatus for controlling, in a prescribed ratio, the mixing of two liquid streams which originate from respective storage tanks comprising:
    meter means disposed in each of said storage tanks for detecting the liquid level in each of said storage tanks;
    a pair of variable resistors, each of said meter means being connected to one of said variable resistors to vary the magnitude of said variable resistors in accordance with the changes in the liquid level in the corresponding storage tank whereby the change in magnitude of said resistors is proportional to the quantity of liquid withdrawn from the corresponding storage tank;
    a pair of double potentiometer circuits, each of said double potentiometer circuits including a first potentiometer and a second potentiometer connected between the movable contact of said first potentiometer and one end thereof with the resistance between the movable contact of said second potentiometer and one end thereof corresponding to one of said variable resistors, said first potentiometers being connected in phase opposition to a voltage source and the movable contacts of said first potentiometers being positioned so that the ratio of the voltages supplied to the respective second potentiometers is equal to said prescribed mixing ratio;
    a summing amplifier having its input electrically connected to the movable contacts of said second potentiometers and to a source of variable voltage which is adjusted prior to the beginning of mixing to produce a zero setting for the output signal from said summing amplifier; and
    means responsive to said output signal of said summing amplifier for controlling the flow in at least one of said liquid streams.

References Cited

UNITED STATES PATENTS

| | | | |
|---|---|---|---|
| 2,509,629 | 5/1950 | De Giers et al. | 137—98 |
| 2,942,613 | 6/1960 | Church | 137—101.25 X |
| 3,036,585 | 5/1962 | Shawhan | 137—101.21 X |
| 3,073,110 | 1/1963 | Dillaway | 137—101.25 X |

WILLIAM F. O'DEA, *Primary Examiner.*

D. ZOBKIW, *Assistant Examiner.*